US010864996B1

(12) United States Patent
Abdalwahid

(10) Patent No.: US 10,864,996 B1
(45) Date of Patent: Dec. 15, 2020

(54) APPARATUS AND METHOD OF MONITORING AND SECURING AIRCRAFT

(71) Applicant: Husam J. Abdalwahid, Bloomfield, NJ (US)

(72) Inventor: Husam J. Abdalwahid, Bloomfield, NJ (US)

( * ) Notice: Subject to any disclaimer, the term of this patent is extended or adjusted under 35 U.S.C. 154(b) by 0 days.

(21) Appl. No.: 16/798,021

(22) Filed: Feb. 21, 2020

(51) Int. Cl.

| | |
|---|---|
| ***B64D 45/00*** | (2006.01) |
| ***B64D 47/08*** | (2006.01) |
| ***G08B 13/19*** | (2006.01) |
| ***H04N 7/18*** | (2006.01) |
| ***G08B 13/196*** | (2006.01) |
| ***H04N 5/225*** | (2006.01) |

(52) U.S. Cl.
CPC ............ *B64D 45/00* (2013.01); *B64D 47/08* (2013.01); *G08B 13/1966* (2013.01); *G08B 13/19632* (2013.01); *G08B 13/19636* (2013.01); *G08B 13/19645* (2013.01); *G08B 13/19656* (2013.01); *G08B 13/19684* (2013.01); *H04N 5/2253* (2013.01); *H04N 7/181* (2013.01); *B64D 2045/0085* (2013.01); *B64D 2211/00* (2013.01)

(58) Field of Classification Search
None
See application file for complete search history.

(56) References Cited

U.S. PATENT DOCUMENTS 4,933,668 A * 6/1990 Oyer .................... G08B 26/002 340/12.32
6,545,601 B1 * 4/2003 Monroe ............. B64D 45/0015 340/521
6,864,805 B1 * 3/2005 Gomez ............. B64D 45/0015 340/945
7,049,953 B2 * 5/2006 Monroe ............. B64D 45/0015 340/521
7,131,136 B2 10/2006 Monroe
7,417,542 B2 8/2008 Bruch
7,511,612 B1 * 3/2009 Monroe ............. B64D 45/0015 340/521
7,551,075 B1 * 6/2009 Monroe ............. B64D 45/0015 340/521
9,701,424 B2 7/2017 Hausmann et al.
10,404,949 B2 9/2019 Lee et al.
10,514,711 B2 * 12/2019 Bar-Nahum .......... B64C 39/024
2003/0152145 A1 * 8/2003 Kawakita ............... H04N 7/083 375/240.12

(Continued)

*Primary Examiner* — Reza Aghevli
(74) *Attorney, Agent, or Firm* — Walter J. Tencza, Jr.

(57) ABSTRACT

A portable wireless aircraft security monitoring system including first, second and third apparatuses configured to removably attach to an exterior of an aircraft via vacuum suction mounting devices that may include one or more suction cups. The first and second apparatus may include a camera, a motion sensor, a microphone/speaker, and a data processor; and wherein the camera, motion sensor, and the microphone provide information to the data processor, which wirelessly communicates with the device of the third apparatus to communicate via the Internet to a user smartphone software application. The third apparatus may include a Wi-Fi wireless router hotspot configured to connect to the Internet and may broadcast a Wi-Fi signal which allows the Wi-Fi enabled first and second apparatus to connect to the internet to send/receive data alerts to the user's smartphone.

18 Claims, 13 Drawing Sheets

1 40 38 36 34 6 4 28 31 30 32 24 26 10c 2 10a 10 22 10d 10b 12 16 14 27 25 REMOVE BEFORE FLIGHT

(56) References Cited

U.S. PATENT DOCUMENTS

| | | | | |
|---|---|---|---|---|
| 2003/0169335 | A1* | 9/2003 | Monroe | G08B 13/19673<br>348/143 |
| 2007/0176793 | A1* | 8/2007 | Bruch | B64D 45/0015<br>340/945 |
| 2014/0236390 | A1* | 8/2014 | Mohamadi | B64C 29/00<br>701/2 |
| 2016/0288923 | A1* | 10/2016 | Hausmann | B64D 45/00 |
| 2017/0233098 | A1* | 8/2017 | Gerard | B64D 45/0015<br>348/159 |
| 2017/0316664 | A1* | 11/2017 | Gerard | H04N 5/23203 |
| 2018/0005362 | A1* | 1/2018 | Wang | G06T 7/001 |
| 2018/0013985 | A1* | 1/2018 | Lee | H04N 1/2112 |
| 2018/0115699 | A1* | 4/2018 | Lovaasen | B64D 47/08 |
| 2018/0210465 | A1* | 7/2018 | Qu | H04N 5/2252 |
| 2018/0276810 | A1* | 9/2018 | Wang | G06T 7/0004 |
| 2018/0309786 | A1* | 10/2018 | Apelewicz | H04L 9/0861 |
| 2018/0362190 | A1* | 12/2018 | Chambers | B64C 39/024 |
| 2019/0025858 | A1* | 1/2019 | Bar-Nahum | B64D 47/08 |
| 2019/0086920 | A1* | 3/2019 | Miller | B64D 17/80 |
| 2019/0177004 | A1* | 6/2019 | Skelly | G06T 19/006 |
| 2019/0263339 | A1* | 8/2019 | Lee | B60Q 3/70 |

* cited by examiner

C1
C2
C3
C4
1
31
32a
32b
32
28
10
REMOVE BEFORE FLIGHT
1

APPARATUS AND METHOD OF MONITORING AND SECURING AIRCRAFT

FIELD OF THE INVENTION

This invention relates to methods and apparatuses for on ground aircraft security surveillance and monitoring.

BACKGROUND OF THE INVENTION

Thousands of business and private aircraft take flight everyday all over the world. These aircraft are flying homes and offices that allow their owners to travel privately and comfortably to many different places around the world. When business/private aircraft arrive to their destination airports, they taxi to a private terminal for parking. There are a variety of different events that can take place while aircraft are on the ground and parked. Unfortunately, the world we live in is full of unrest, conflict and violence, not all airports and FBOs (fixed base operators) around the world have the same security standards we may expect. Some may have high standards and some may be very poor. While aircraft stay parked at destination FBOs, they are usually exposed, unprotected and susceptible to a wide range of risks such as theft, sabotage, joy riders, terrorism, vandalism and most importantly potential damage caused by other moving aircraft or by FBO service equipment and personnel. Such a high value asset like an aircraft when parked and unattended, must have some means of protections and security monitoring.

The demand for on-ground aircraft security monitoring systems have driven many to develop different solutions. There are currently two different types of solutions offered for aircraft security monitoring in the market. One type currently used in service is an on-board system which is permanently installed on the aircraft and is considered the industry standard. The other is a stand-along two-unit system that is placed on the ground near the aircraft and it's not as commonly used.

There are many disadvantages to known on-board aircraft security monitoring systems. They are extremely complex, heavy, expensive, not user friendly, unreliable, high-maintenance and most importantly, the installation requires major alteration to original aircraft's systems and airframe structure design. In addition, the system's specification, material and components must be approved by each aircraft's type manufacturer and certified by the local aviation authorities such as the FAA (Federal Aviation Administration) or EASA (European Avaition Safety Agency) where the aircraft is registered in.

Furthermore, the system's operation and utilization is limited in many ways. The cameras' fields of view and the motions' sensor's coverage areas are restricted to a fixed location predetermined upon installation. The selection of the devices' locations and positioning is also subject to approval by the aircraft's manufacturer to insure they do not interfere with original-essential aircraft systems and the aerodynamic flight characteristics of the aircraft. Therefore, the outcome of the cameras' viewing angles and motion sensors' coverage areas might not be satisfactory enough to provide effective monitoring of the aircraft.

Another significant drawback to on-board security monitor systems is the power supply. As aircraft can sometimes stay parked at destination airports for long periods of time, ensuring continuous power supply for such a complex system with many interconnected parts is a big challenge. Since the system is needed when the aircraft is powered off and parked, the system must have its own independent power supply to power all of the system's components for extended periods of time. Current systems on the market are only capable of supplying continuous power for forty-eight to seventy-two hours depending on the amount of activities triggering the system.

The other type of aircraft security monitoring system currently offered on the market is a stand alone two-unit system that is placed on the ground near the aircraft. The system is not permanently installed on the aircraft. Instead, the unit is stored inside the aircraft as loose equipment and placed in position outside the aircraft usually near the nose landing gear when needed to operate.

One of most significate drawbacks is that it has to be placed outside on the ground and somewhat connected to parts of the aircraft. The problem with this, is when aircraft stay at FBOs, they usually don't stay parked in the same location. The line service (aircraft towers) sometimes have to reposition parked aircraft multiple times during the stay for a number of reasons. It is not convenient to have this device placed there and having to moving it every time the aircraft is moved. Beside the point, it's almost impossible to train all FBOs personnel to handle the system. It works best if the crew knows for sure that the aircraft will not be moved after it is parked which is not the case in most of the private/business aviation industry. FBOs ramp areas for the most part are small in size and have to move parked aircraft around all the time to utilize their parking area efficiently.

Furthermore, the system can only be placed in one location that will provide one vantage point of view of the monitored area. The system can be very ineffective if the intruder is in an area where it's not best covered. Therefore, the system's limited application and impracticality are major factors in why it is not widely used in the industry.

In summary, when an aircraft is on the ground parked at an FBO somewhere in the world, it is susceptible to a variety of different events that may compromise its sanctuary. Securing and monitoring any high value asset is a standard practice these days. Business/private aircraft security monitoring can be challenging due to the nature of the industry and operations. The aircraft security monitoring systems currently available in the market do not provide a full practical and efficient solution.

Accordingly, it is desirable to provide a technology that can resolve all of these issues at low cost, without permanent installed or modification to the aircraft and deliver a practicable, efficient system that can be utilized in all types of aircraft and operations scenarios.

SUMMARY OF THE INVENTION

One or more embodiments of the present application provide a portable aircraft wireless security monitoring system which is typically a portable wireless surveillance cameras kit. An apparatus, method, and/or system of one or more embodiments of the present invention allows aircraft owner/operators to monitor the status of their parked aircraft online via smartphones in real-time, wherever they are in the world for long periods of time. One or more embodiments offer the ultimate solution to effectively and efficiently provide security monitoring of parked and unattended aircraft without the need for permanent installation or modification to the aircraft.

The system's kit, in at least one embodiment, is comprised of multiple compact size wireless surveillance instruments that include an HD (high definition) and night vision camera with built-in motion sensor, built-in speaker/microphone and built-in solar charger and battery pack. These units, in at least one embodiment are preferably attached/detached to the outside airframe of the aircraft via vacuum suction mounting devices and can be placed in any desired location chosen by the user. In at least one embodiment of the present application, an apparatus, system, and method is provided which includes a single portable broadband Wi-Fi connection hub per kit that connects to the internet via 4G LTE (long term evolution standard for broadband communications) with an international SIM card (smart phone card) and a built-in solar charger. The portable Wi-Fi hub can also be attached/detached to the outside airframe of the aircraft via a vacuum suction mounting device and can also be placed in any desire location chosen by the user. The system user interface and controls is configured to be accomplished remotely via a smartphone application software designed for the system. The kit is offered in a portable compact size protective case that can be stored on-board the aircraft. The number of security cameras that comes in the kit is optional. Customers can select how many devices they need based on the size of the aircraft or how many areas they would like to monitor.

In at least one embodiment, while crew members prepare the aircraft for parking, they will attach cameras on different positions on the aircraft's airframe to cover all the desired areas. Then they will also attach a portable Wi-Fi hub on any location they chose. After all the devices have been mounted and turned on, the crew then arms the apparatus, system, and method, with their smartphones via the system's computer software application typically via a smart phone. The system then goes into a standby mode, ready to detect any intrusions.

Any intrusion detected by the build-in motion sensors, in at least one embodiment, instantly activates the cameras to start recording and send alert notifications to the crew members' smartphones. Crew members can then open the computer software application on their phone and view the event. They can also select live-view in real time of the event area and with the build-in speaker and microphone, they can also communicate or send verbal warnings to the intruder.

A system, apparatus, and method of a portable aircraft wireless security monitoring system of one or more embodiments of the present invention, provides a wide range of solutions to the problems current systems on the market have.

In at least one embodiment, the invention eliminates the need for a costly permanent install to the aircraft which requires modification and certifications.

The system, apparatus, and method may independently stay powered on for long periods of time using the built-in solar chargers.

The system, apparatus, and method provides customized monitoring coverage areas of the aircraft by attaching the wireless surveillance cameras on any desire location of the airframe via the vacuum suction mount.

In at least one embodiment, real-time notifications and live monitoring of the aircraft from anywhere in the world via a smartphone is provided.

The mobility and compact size of the system's components, in at least one embodiment, make it very easy to handle by the crew members and can neatly be stored on-board the aircraft.

In at least one embodiment, the invention is a maintenance free system. No continuous airworthiness certification required since it is considered an aircraft ground equipment kit.

In at least one embodiment, a system, apparatus, and method is provided at a relatively low cost price compare to current systems on the market.

In at least one embodiment, an overall apparatus, system and/or method is provided comprising: a first apparatus which is configured to removably attach to an exterior of an aircraft; and a second apparatus which is configured to removably attach to the exterior of the aircraft; and wherein the second apparatus includes a wireless hub which communicates with a device of the first apparatus and which enables the device of the first apparatus to communicate on the Internet through the wireless hub of the second apparatus.

The overall apparatus, system, and/or method may also include a third apparatus which is configured to removably attach to the exterior of the aircraft; and wherein the third apparatus includes a device which is configured to communicate on the Internet through the wireless hub of the second apparatus.

The first apparatus may include a camera and a base to which the camera is mounted, and the camera may oriented in a first direction with respect to the base of the first apparatus; and wherein the third apparatus includes a camera and a base to which the camera is mounted and the camera is oriented in a second direction with respect to the base of the third apparatus, where the second direction is substantially different from the first direction. The second direction may be substantially perpendicular to the first direction.

The first apparatus may include a camera which is configured to provide information via the Internet through the wireless hub of the second apparatus. The first apparatus may include a motion sensor which is configured to provide information via the Internet through the wireless hub of the second apparatus. The first apparatus may include a microphone which is configured to provide information via the Internet through the wireless hub of the second apparatus. The first apparatus may include a solar charger which is configured to provide power to the camera of the first apparatus.

The first apparatus may include a camera, a motion sensor, a microphone, and a data processor; and wherein the camera, motion sensor, and the microphone provide information to the data processor, which communicates with the device of the second apparatus to communicate via the Internet.

The first apparatus may include one or more suction cups which are configured to removably attach to the exterior of the aircraft to removably attach the first apparatus to the exterior of the aircraft; and the second apparatus may include one or more suction cups which are configured to removably attach to the exterior of the aircraft to removably attach the second apparatus to the exterior of the aircraft.

In at least one embodiment, a method is provided which may include removably attaching a first apparatus to an exterior of an aircraft; removably attaching a second apparatus to the exterior of the aircraft; and wherein the second apparatus includes a wireless hub which communicates with a device of the first apparatus and which enables the device of the first apparatus to communicate on the Internet through the wireless hub of the second apparatus. The method may further include removably attaching a third apparatus to the exterior of the aircraft; and wherein the third apparatus includes a device which is configured to communicate on the Internet through the wireless hub of the second apparatus.

The first, second, and third apparatus for use in accordance with a method of an embodiment of the present invention may be configured as previously described.

DETAILED DESCRIPTION OF THE DRAWINGS

Figure 1:
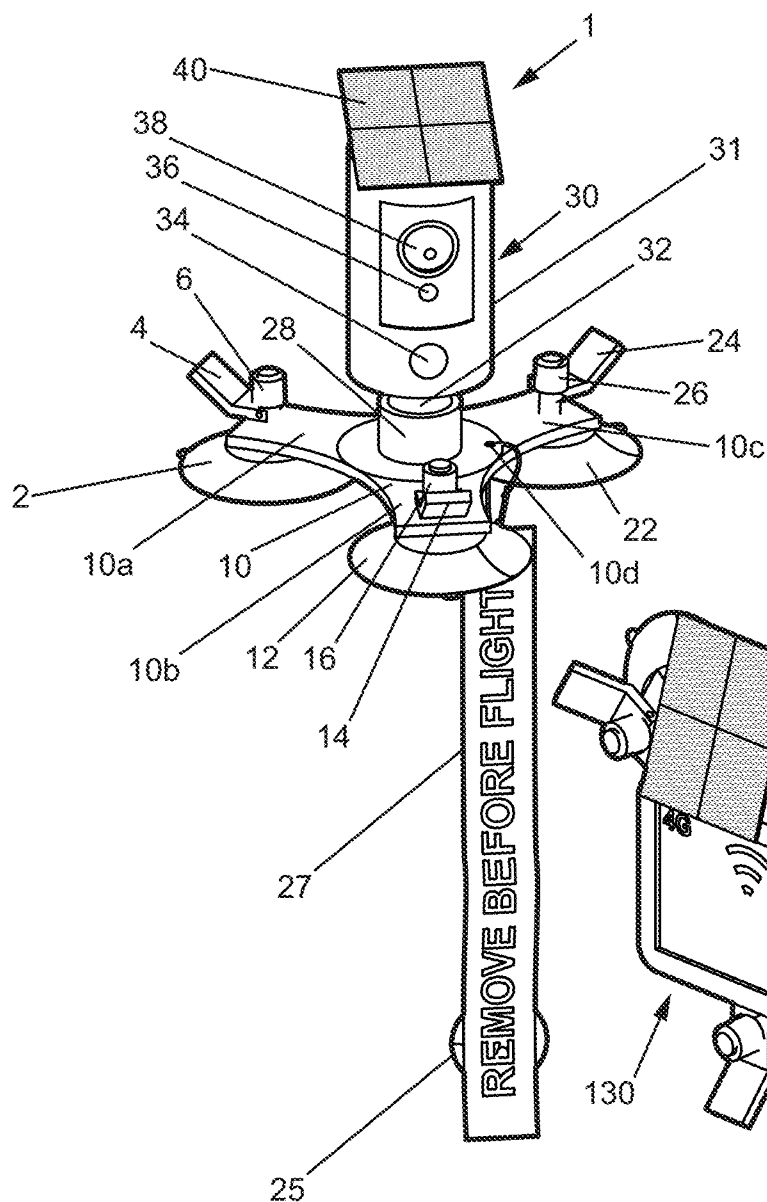
FIG. 1 shows a front and top perspective view of a first apparatus in accordance with an embodiment of the present invention.
Figures 5, 6:
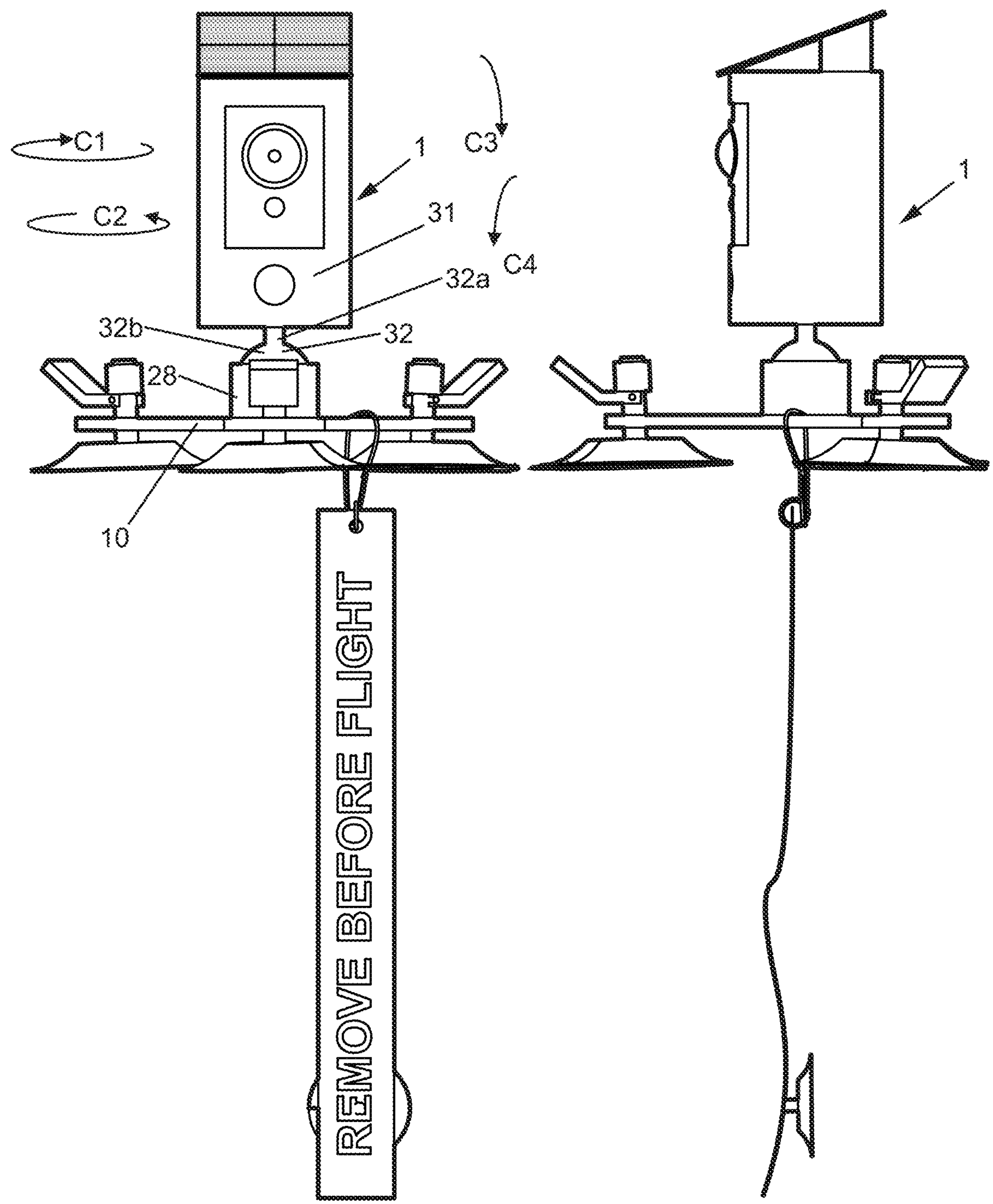
FIG. 5 shows a front view of the apparatus of FIG. 1.
FIG. 6 shows a side view of the apparatus of FIG. 1.
Figure 10:
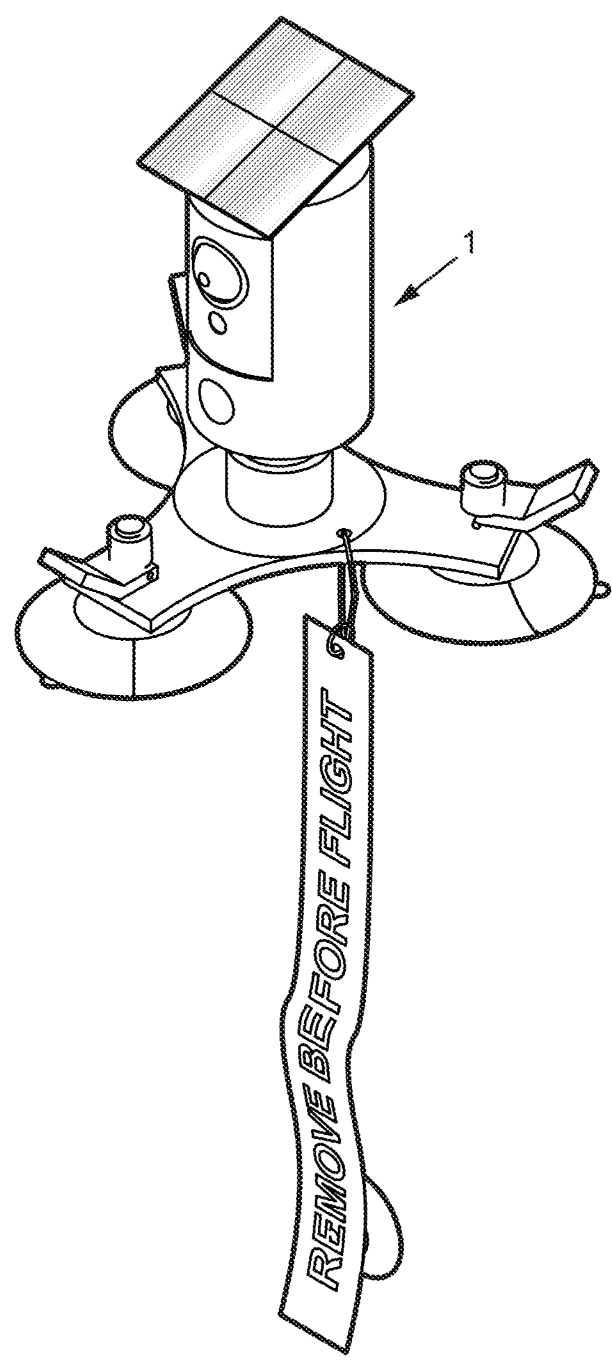
FIG. 10 shows a top, side, and front perspective view of the apparatus of FIG. 1.

FIG. 1 shows a front and top perspective view of a first apparatus 1 in accordance with an embodiment of the present invention. FIG. 5 shows a front view of the apparatus 1 of FIG. 1. FIG. 6 shows a side view of the apparatus 1 of FIG. 1. FIG. 10 shows a top, side, and front perspective view of the apparatus 1 of FIG. 1. The apparatus 1 includes a base 10 which has projections or protrusions 10*a*, 10*b*, and 10*c*. The apparatus 1 further includes suction cups 2, 12, and 22, which are connected by fasteners 6, 16, and 26, respectively, to the base 10. Levers 4, 14, and 24, are used to cause suction to be applied by the cups 2, 12, and 22, respectively, in any known manner. Any known attachable and releasable suction cups which are suitable for attaching to the exterior of an airplane may be used for suction cups 2, 12, and 22, and related components 4, 6, 14, 16, 24, and 26.

The apparatus 1 further includes a member 28 fixed to a center of the base 10. A device 30 and housing 31 is releasably connected to the member 28 through a member 32.

As shown in FIG. 5, the member 32 may include a stem portion 32*a* and a ball 32*b*. It is critical in at least one embodiment, that the housing 31 be rotatably mounted to the base 10, such that the housing 31, including the camera 38, sensor 36, and the solar panel/charger 40, is configured to be rotated three hundred sixty degrees, such as in the clockwise direction C1 or in the counterclockwise direction C2, in the plane of the base 10. The housing 31 is typically rotatably mounted to the base 10 such that housing 31 is configured to also be rotated in the directions C3 and C4, from the upright position in FIG. 5 to a position where the housing 31 is nearly parallel to the base 10. The rotatable mounting of the housing 31 with respect to the base 10 as in FIG. 5, allows the orientation and position of the camera 38, sensor 36, and solar panel/charger 40 to be changed to optimize what is viewed by the camera 38, sensed by the sensor 36, and/or to optimize solar energy collected by the solar panel/charger 40. ?? may want to show a Figure where each of camera 38, sensor 36, and panel 40 can be changed ??

The ball 32*b* and the member 28 may together form a known ball socket joint. The ball 32*b* is configured to be snapped into the member 28, and snapped out of the member 28. In at least one embodiment, it is critical that the apparatus 200 have a ball 232*b*, and a member 228, shown in FIG. 4, which are identical in function and in structure to the ball 32*b* and the member 28. This allows either of base 10 or 210 to be used with either of apparatus 1 or 200. This is critical in at least one embodiment, because it allows a plurality of base 10 and related suction cups to be manufactured for either apparatus 1 or 200.

Figure 8:
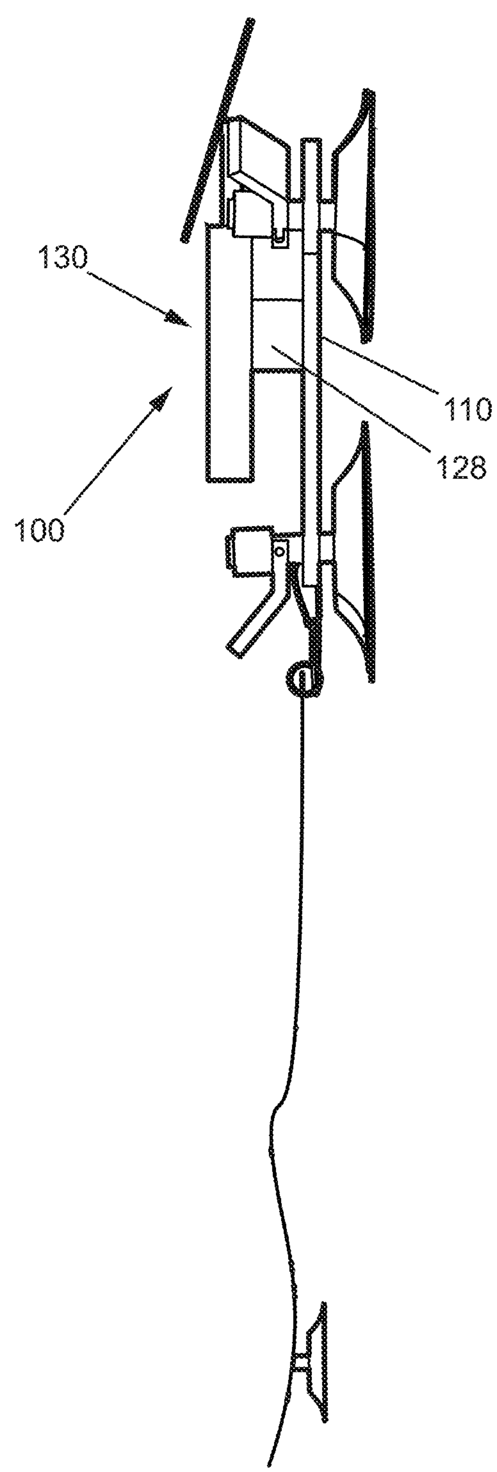
FIG. 8 shows a side view of the apparatus of FIG. 2.

In FIG. 8, the device or hub 130 is fixed and not rotatably mounted to the base 110. Generally, the angle of the device or hub 130 is not significant and in at least one embodiment, it is critical to save expenses to fix the device 130 directly to member 128 so the device 130 is fixed in orientation with respect to base 110. The base 110 and the member 128 may be the same as base 10 and member 28, but a ball, such as ball 32*b* is not used in FIG. 8.

The device 30 may include a microphone/speaker 34, a motion sensor 36, a high definition HD/night vision camera 38, and solar panel or charger 40. The device 30 may also have a housing 31 in which may be located a computer processor, computer memory, and wireless transmitter receiver, which may be part of data processor and wireless transmitter/receiver 612 shown in FIG. 17. In addition a battery 610 is typically located in the housing 31 connected to and for providing electrical power to the components 34, 36, 38, 40, and 612. The device 30 may be called a portable wireless surveillance camera/sensor.

A tag or banner 27 may be attached to the base 10, at a first end of the tag 27, through a cord inserted into an opening 10*d* of the base 10. The tag 27 may be attached at an opposite end of the tag or banner 27 to a suction cup 25 for attaching to an exterior of an airplane.

Figure 2:
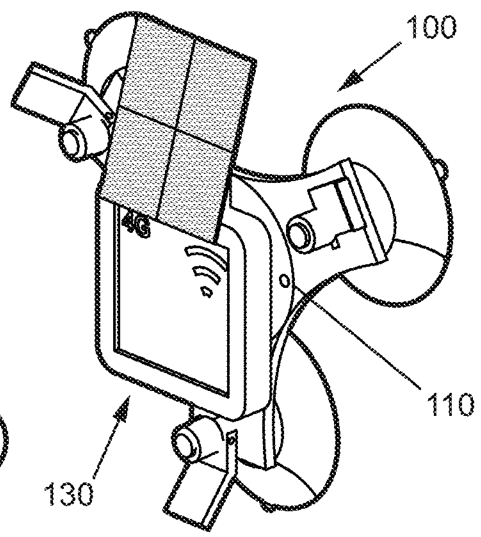
FIG. 2 shows a front and top perspective view of a second apparatus in accordance with an embodiment of the present invention.
Figure 7:
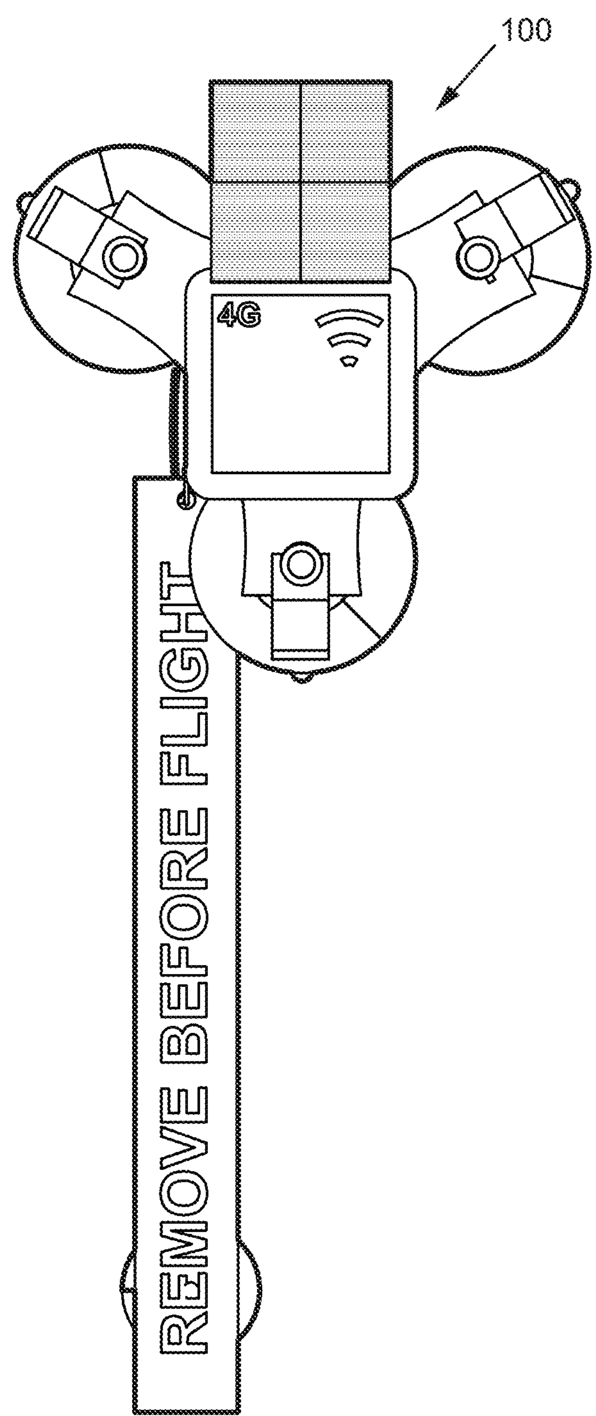
FIG. 7 shows a top view of the apparatus of FIG. 2.

FIG. 2 shows a front and top perspective view of a second apparatus 100 in accordance with an embodiment of the present invention. FIG. 7 shows a top view of the second apparatus 100 of FIG. 2. FIG. 8 shows a side view of the second apparatus 100 of FIG. 2. The apparatus 100 may be identical to the apparatus 1 of FIG. 1, except as will be described.

The apparatus 100 includes a base 110 which may be identical to the base 10 of FIG. 1, except as will be described. The apparatus 100 include a device 130. The device 130 may be or may include a Wi-Fi hotspot, and/or wireless router which is configured to connect the internet, such as for broadband Internet access. The device 130 may be any known router and/or hotspot, and/or Wi-Fi hub which is configured to communicate with the apparatus 1 and the apparatus 200 (of FIG. 3) to allow the apparatus 1 and the apparatus 200 access the internet through the device 130. In at least one embodiment, typically only one apparatus 100 and therefore only one device 130 is attached to a single aircraft or airplane by use of suction cups identical to suction cups 2, 12, and 22 of the apparatus 1. However, it is possible to use more than one apparatus 100 if required.

The device 130 is removably attached to the base 110, in a manner which may be similar or identical to the manner that device 30 is attached to the base 10.

The apparatus 100 includes components identical to components 2, 4, 6, 12, 14, 16, 22, 24, and 26, and therefore those components will not be described again.

Figure 3:
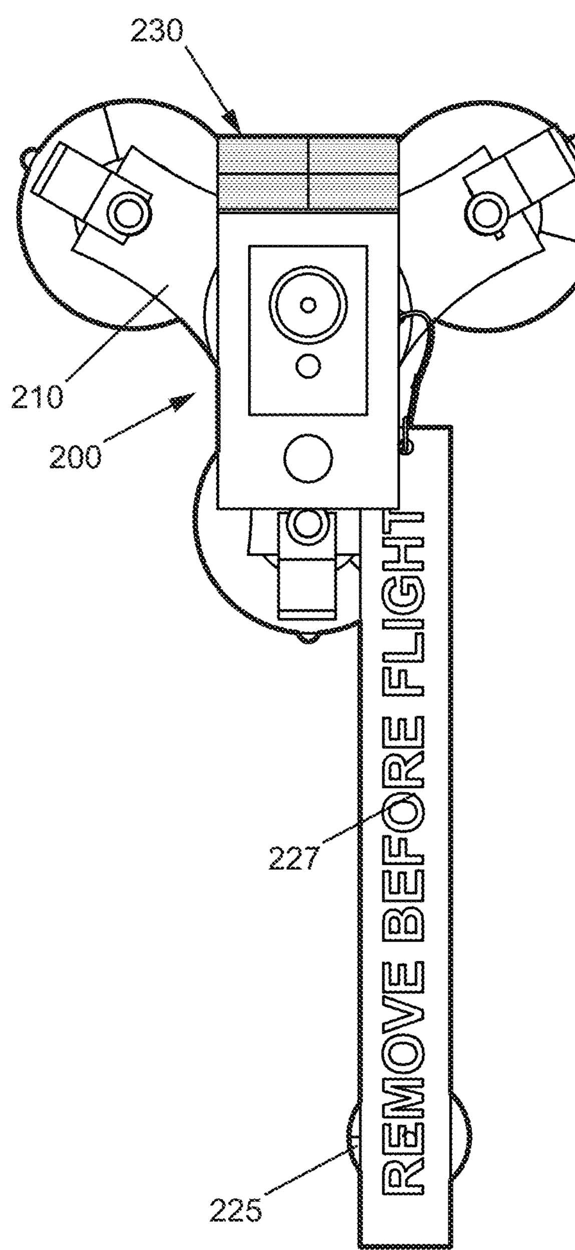
FIG. 3 shows a top view of a third apparatus in accordance with an embodiment of the present invention.
Figure 4:
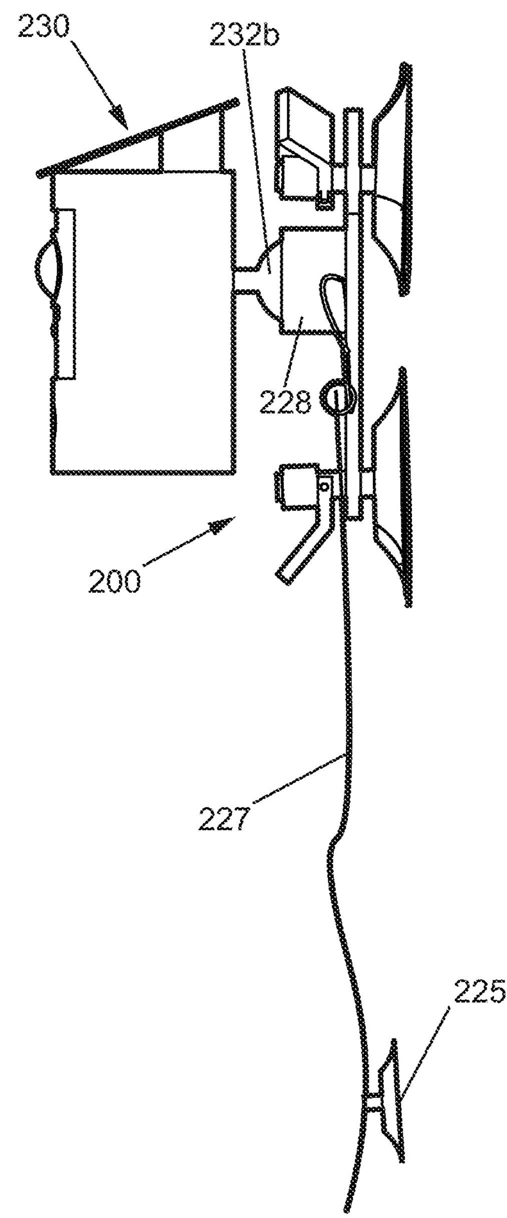
FIG. 4 shows a side view of the apparatus of FIG. 3.
Figure 9:
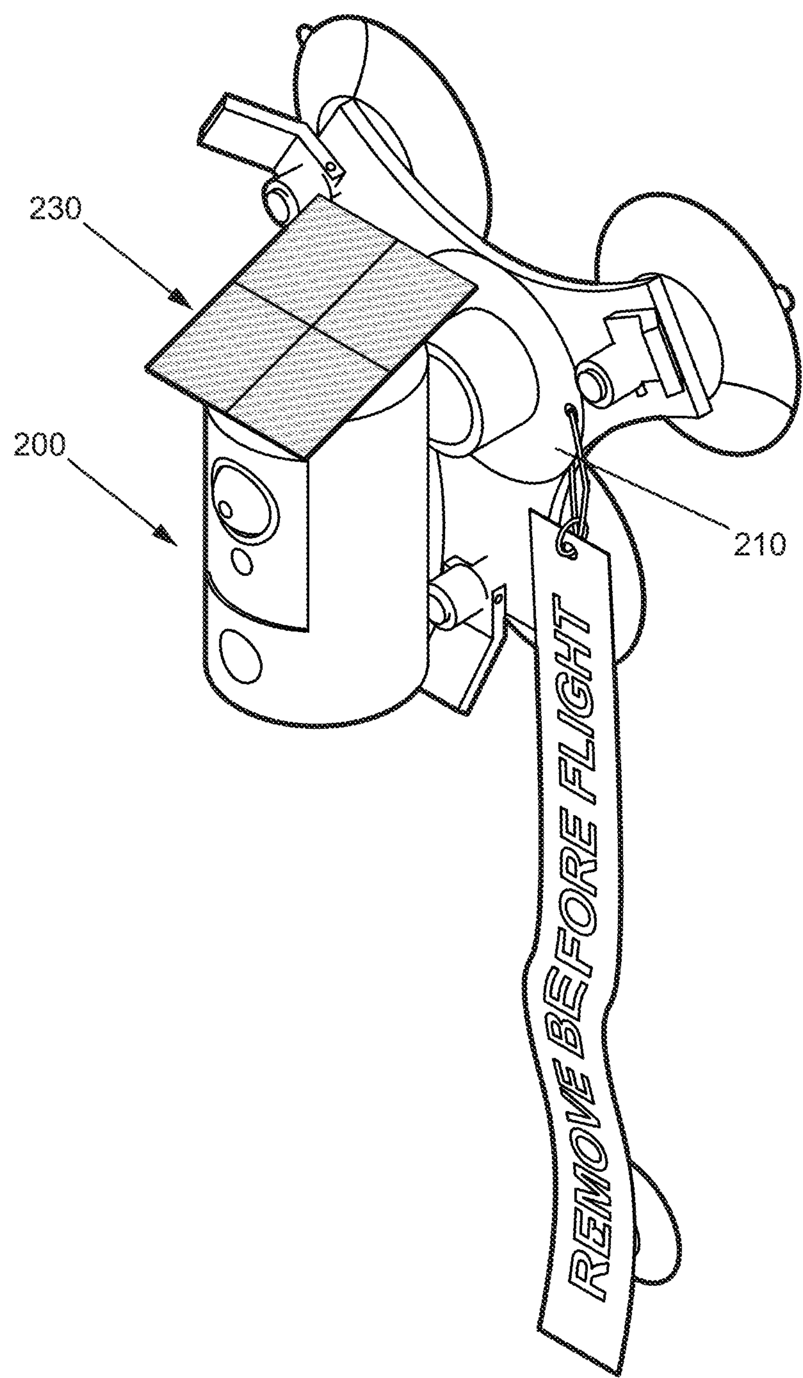
FIG. 9 shows a top, side, and front perspective view of the apparatus of FIG. 3.

FIG. 3 shows a top view of a third apparatus 200 in accordance with an embodiment of the present invention. FIG. 4 shows a side view of the apparatus 200 of FIG. 3. FIG. 9 shows a top, side, and front perspective view of the apparatus 200 of FIG. 3.

The apparatus 200 may be identical to the apparatus 1 except as will be described. The apparatus 200 includes a base 210 which may be identical to the base 10 of FIG. 1, except as will be described. The apparatus 200 include a device 230 which may be identical to the device 30, except the device 230 is oriented horizontally. The device 230 is removably attached to the base 210, in a manner which may be similar or identical to the manner that device 30 is attached to the base 10.

The apparatus 200 includes components identical to components 2, 4, 6, 12, 14, 16, 22, 24, and 26, and therefore those components will not be described again.

Figure 11:
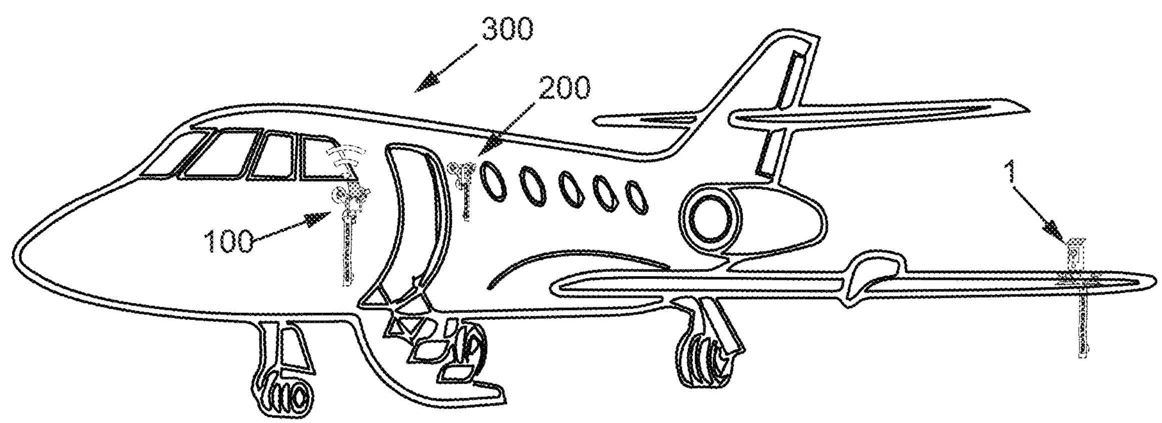
FIG. 11 shows a simplified view of an airplane, with the first apparatus, the second apparatus, and the third apparatus attached to the airplane in accordance with an embodiment of the present invention.

FIG. 11 shows a simplified view of an airplane 300, with the first apparatus 1, the second apparatus 100, and the third apparatus 200 removably attached to the airplane 300 in accordance with an embodiment of the present invention. The first apparatus 1 is shown attached to a wing of the airplane 300, the second apparatus 100 is shown attached near a cockpit, ahead of a door, and the third apparatus 200 is shown attached behind the door of the airplane 300.

The first apparatus 1 is used on the airplane 300 on the wing, because the vertical mounting, of device 30, at the location shown in FIG. 11, permits better coverage and range for the camera 38, and by the motion sensor 36.

The third apparatus 200, is used on the airplane 300, near the door of the airplane 300, on a sidewall of the fuselage, because the horizontal mounting of the device 230 at the location shown in FIG. 11, permits better coverage and range for a camera of the device 230 (a camera which may be similar or identical to camera 38 but part of the device 230) and by a motion sensor of the device 230 (a motion sensor which may be similar or identical to the motion sensor 36, but part of the device 230).

Figure 12:
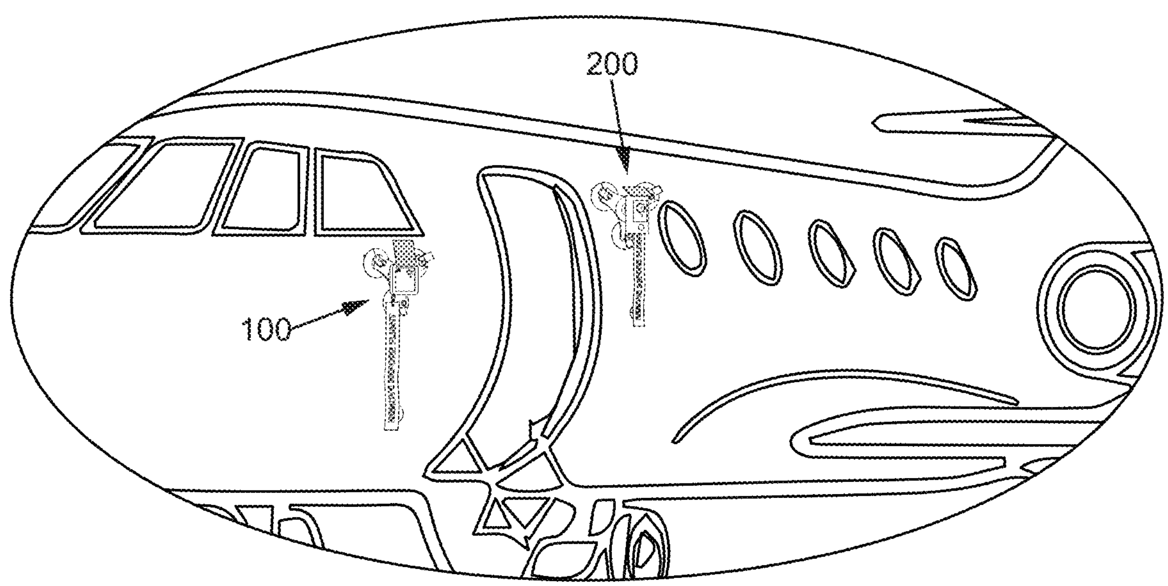
FIG. 12 shows a closeup view of the second apparatus and the third apparatus attached to the airplane.

FIG. 12 shows a closeup view of the second apparatus 100 and the third apparatus 200 attached to the airplane 300.

Figure 13:
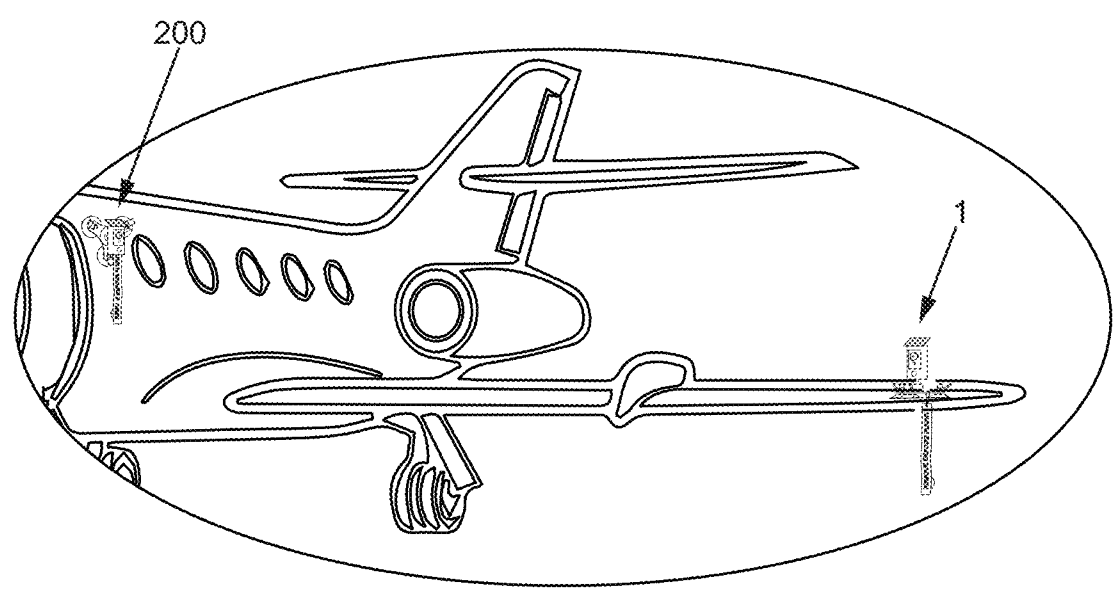
FIG. 13 shows a closeup view of the first apparatus and the second apparatus attached to the airplane.

FIG. 13 shows a closeup view of the first apparatus 1 and the third apparatus 200 attached to the airplane 300.

Figure 14:
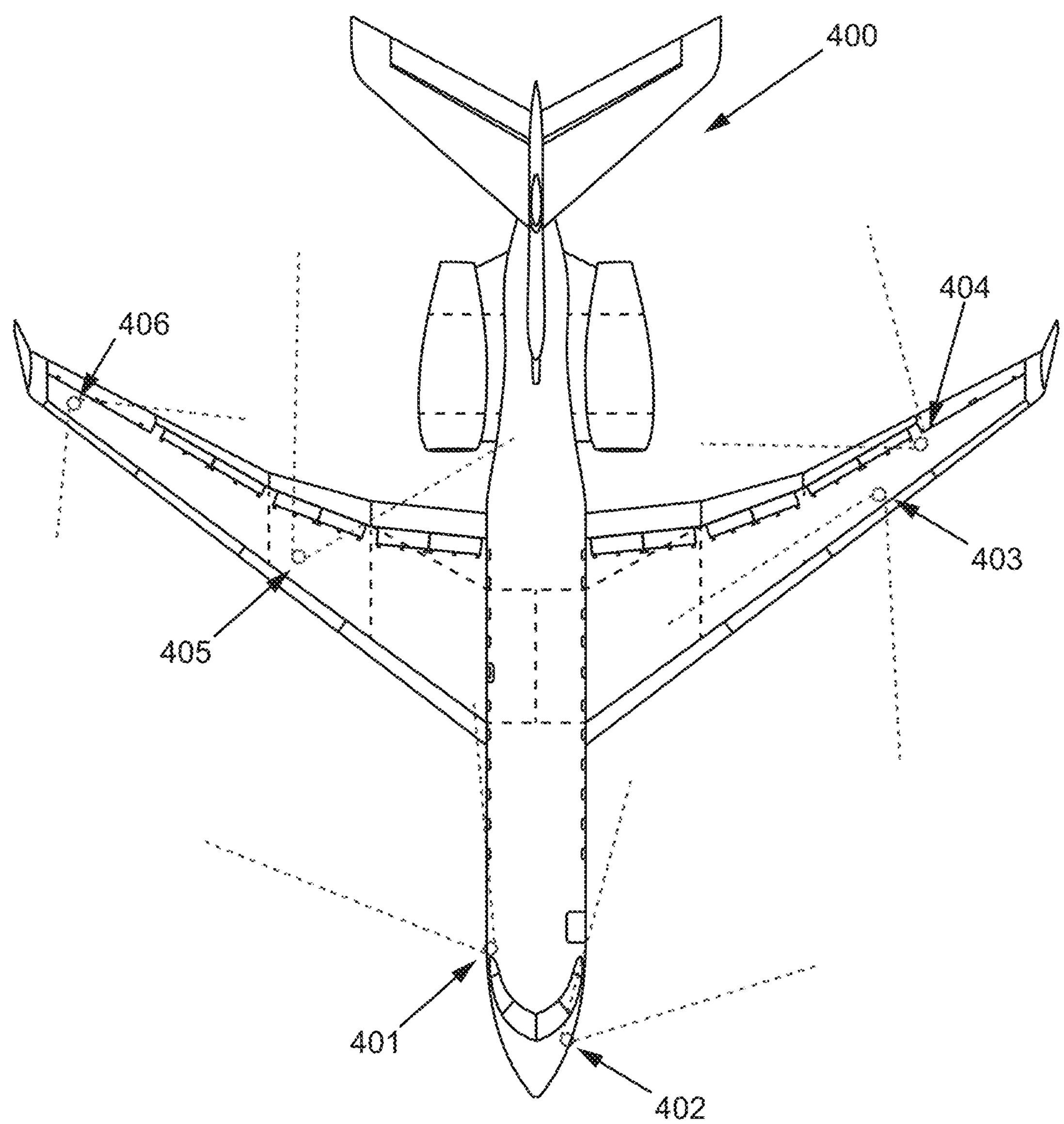
FIG. 14 shows a top view of a simplified diagram of an airplane with one or more of the first, the second, and the third apparatus attached to the airplane.

FIG. 14 shows a top view of a simplified diagram of an airplane 400 with one or more of the first, and the third apparatuses 1 and 200, attached to the airplane 400. Each of the apparatuses 401, 402, 403, 404, 405, and 406, may be either apparatus 1 or apparatus 200. Each of the apparatuses 401-406 is shown with dashed lines to indicate a range of sight for a camera or other detection device.

Figure 15:
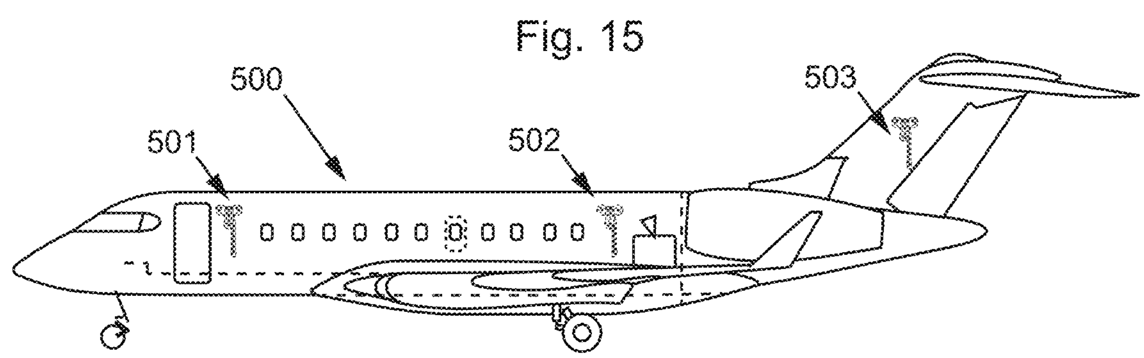
FIG. 15 shows a side view of a simplified diagram of an airplane with one or more of the first, the second, and the third apparatus attached to the airplane.
Figure 16:
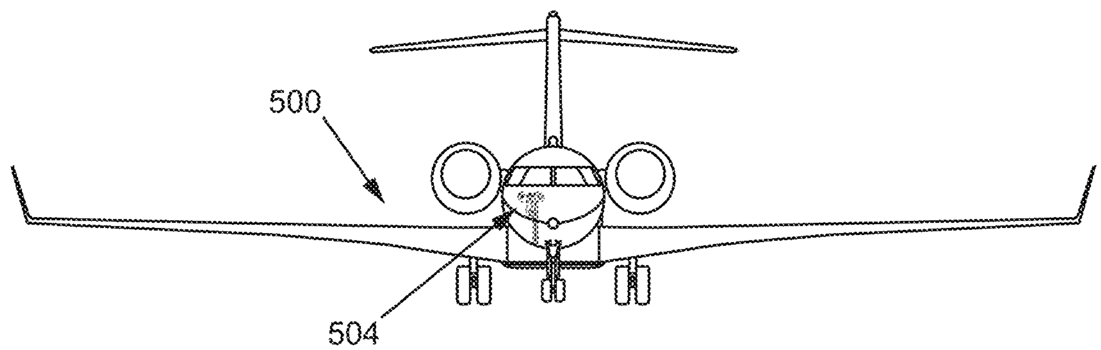
FIG. 16 shows a front view of a simplified diagram of the airplane of FIG. 15 with one or more of the first, the second, and the third apparatus attached to the airplane.

FIG. 15 shows a side view of a simplified diagram of an airplane 500 with one or more of the first, the second, and the third apparatuses 1, 100, and 200, respectively, attached to the airplane 500. FIG. 16 shows a front view of a simplified diagram of the airplane 500 of FIG. 15 with one or more of the first, the second, and the third apparatuses 1, 100, and/or 200 attached to the airplane 500.

Apparatus 501, 502, 503, and 504 (shown in FIG. 16) are attached at various locations to the airplane 500. Apparatus 501 is attached near a door; apparatus 502 is attached near the rear of the passenger compartment; apparatus 503 is attached to a rudder of the airplane 500; and apparatus 504 is attached at the front of the airplane 500. Each of the apparatuses 501-504 may be one or more of the first, second, and third apparatuses 1, 100, and/or 200. However, in at least one embodiment it is preferred that only one second apparatus 100 may be used, while it is preferred that at least two apparatuses, of either apparatus 1 and/or 200 may be used.

Figure 17:
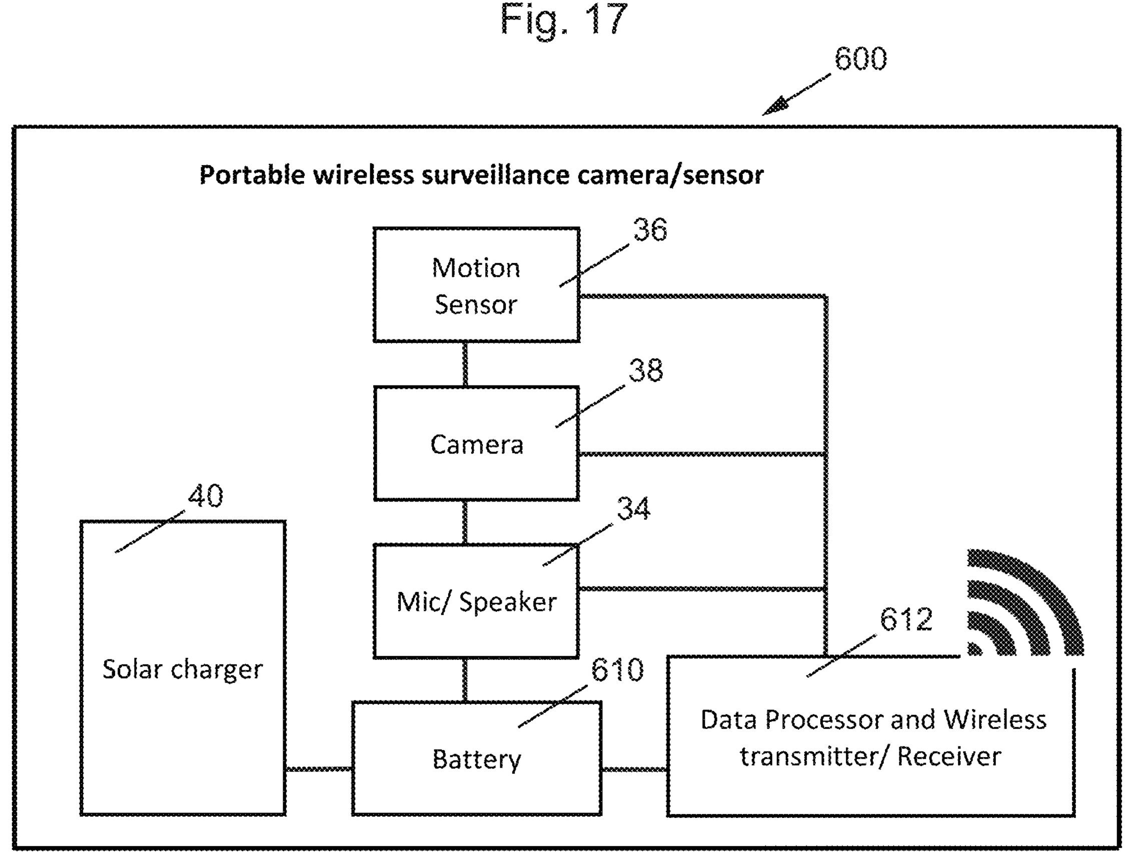
FIG. 17 shows a simplified block diagram of various components which may be used in one or more of the first, the second, and the third apparatus.

FIG. 17 shows a simplified block diagram 600 of various components which may be used in each of one or more of the first and the third apparatuses 1, and 200, respectively.

The diagram 600 shows a motion sensor 36, a camera 38, a microphone speaker 34, a solar charger and/or panel 40, a battery 610, which may be part of each of devices 30, and 230, shown in FIGS. 1, and 3, respectively, and a data processor and wireless transmitter/receiver 612, which also may be part of any or each of the devices 30 and 230.

In one or more embodiments of the present invention, one or more of the apparatuses 1, 100, and 200 acting together, typically do not require permanent installation on the aircraft structure or certifications. The use of solar power, such as through a solar panel 40 of apparatus 1, and similar solar panels for apparatus 100 and 200, allow the system to stay powered on independently for long periods of time without using an aircraft's power. A system, using one or more of apparatus 1, 100, and 200 is configured to provide customized monitoring coverage areas of an aircraft. A system, apparatus and method, using one or more of apparatuses 1, 100, and 200 is configured to provide real-time notifications and live monitoring of the aircraft to a user having a smart phone computer application on a smart phone, which communicates with the internet, and with the Wi-Fi hub, router, or hotspot of the apparatus 100. A system apparatus and method using one or more of 1, 100, and 200 is configured to be mobile and easy to handle by crew members. A system, apparatus, and method using one or more of apparatus 1, 100, and 200 is configured to be a user friendly system that is configured to be controlled online via a computer software application on a smartphone from any place in the world; to be a maintenance free system; and to be a reasonable low cost system.

There can be some challenges in complying with those demanded features for aircraft utilization. For example, how to mount the surveillance camera/sensors on the aircraft without modifying the airframe and without permanently installing the surveillance system on the airplane. How to have a system that is not permanently installed and still be able to keep it attached when the aircraft has to be moved around on a ramp? How to have a system that's easy to handle by average crew members? How to ensure there is a reliable internet connection available for the system everywhere the aircraft flies to in order for user to connect online and view/control via smartphone? Last but not least, how to ensure long lasting independent power supply to keep the system running for long term parked aircraft?

Fortunately, one or more embodiments of the present invention offer the ultimate system that meets all of these desirable demands.

Each of the apparatus 1 and/or 200 typically include a portable wireless surveillance camera 38 and motion sensor 36; and a vacuum suction mounting apparatus (including for example components 2, 4, 6, 12, 14, 16, 22, 24, and 26, and similar or identical components for apparatus 200). A overall system, apparatus, and method in accordance with the present invention, provides a portable Broadband Wi-Fi connection hub 130 having a software application stored in computer memory of the hub 130 for communicating with a user's smart phone software application, not shown.

A portable storage case may be provided for storing one or more of the apparatus 1, 100, and 200.

Each of the apparatuses 1 and 200 may include a portable wireless surveillance camera 38, and motion sensor 36. The camera 38 may be a high definition camera with night vision. The motion sensor 36 may be a passive infrared motion sensor with adjustable range.

The apparatuses 1, 100, and 200 may be placed in a substantially weather and impact proof kit or case. The adjustable infrared motion sensor 36 will detect any movement in the covered area and activate camera 38 to start recording in accordance with computer software stored in the data processor or computer processor of the device 612 shown in FIG. 17. The data processor or computer processor of 612, in at least one embodiment is programmed to collect data and then to cause the data to be wirelessly transmitted via the transmitter/receiver of 612 to the internet to a user smartphone App on a user smart phone. Each of the devices 30, 130, and 230 of the apparatus 1, 100, and 200 may be powered by a low voltage battery pack 610 and the solar charger or 40 may be configured to continuously charge the battery 610.

In at least one embodiment, a mounting platform device may be provided, which may include base 10 and components 2, 4, 6, 12, 14, 16, 22, 24, and 26, for each of apparatus 1, 100, and 200. The mounting apparatus of any of apparatus 1, 100, and/or 200 can be harmlessly attached and detached to the outside airframe of the aircraft via multiple vacuum suction cups 2, 12, and 22. The mounting apparatus, in at least one embodiment includes a standard (REMOVE BEFORE FLIGHT) red flag or banner 27 to make sure the crew members remove it before flight.

In at least one embodiment, a typically small portable Wi-Fi wireless router hotspot 130 broadcasts a Wi-Fi signal which allows the Wi-Fi enabled devices 30 and 230 (and components 34, 36, and 38) to get access to the internet, such as through data processor and transmitter/receiver 612, with a fast and secure connection. The portable Wi-Fi connection hub 130 typically connects to the internet through cellular 4G LTE network with a SIM card provided by an international data plane provider. The hub 130 typically includes a battery pack, similar or identical to battery 610 and build-in solar charger, similar or identical to charger 40 to keep it powered for long periods of time.

In at least one embodiment, a virtual control and user interface platform software smartphone application designed and coded for the system is provided as a computer software application on a user's smart phone. The smart phone software application allows the users to control the system, receive alerts, and view events through their smart phone.

In at least one embodiment, a heavy duty, compact and light weight protective box case is provided to place the apparatus 1, 100, and 200 in it to be stored on-board the aircraft when not in use.

Figure 18:
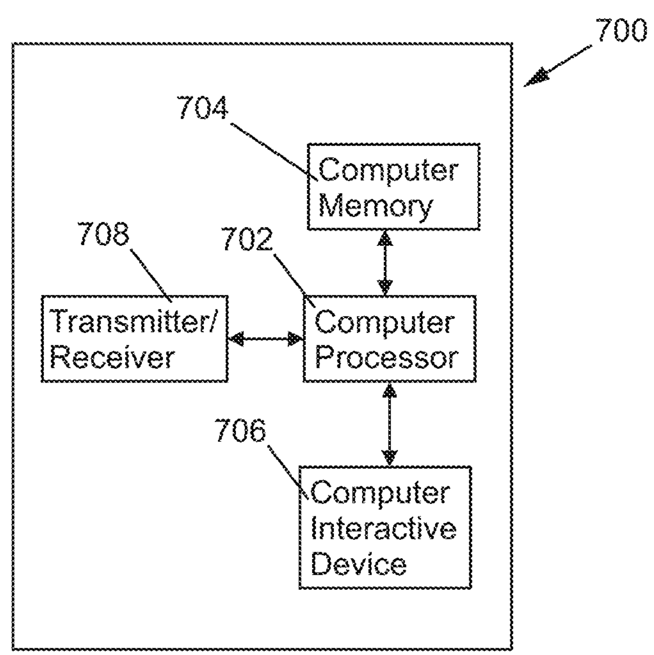
FIG. 18 shows a simplified block diagram of a mobile communications device.

FIG. 18 shows a simplified block diagram of a mobile communications device 700. In at least one embodiment, it is critical that the mobile communications device 700 be a smart phone and/or other portable mobile communications device.

The mobile communications device 700 includes computer processor 702, computer memory 704, computer interactive device 706, and transmitter/receiver 708. The components 704, 706, and 708 typically communicate with the computer processor 702. The computer memory 704 may have stored therein computer software for controlling and communicating with apparatuses 1, 100, and 200 in accordance with an embodiment of the present invention. The computer software stored in the computer memory 704 may be executed by the computer processor 702 as part of a portable wireless aircraft security monitoring system, in accordance with an embodiment of the present invention. The mobile communications device 700 may transmit signals via a transmitter of transmitter/receiver 708 to a receiver of the data processor and wireless transmitter/receiver 612 of each of devices 30, 130, and 230 of apparatuses 1, 100, and 200, respectively. The mobile communications device 700 may receive signals via a receiver of transmitter/receiver 708 from a transmitter of a data processor and wireless transmitter/receiver 612 of each of devices 30, 130, and 230 of apparatuses 1, 100, and 200, respectively. The computer interactive device 706 may include a computer display, such as a touch screen on a smart phone.

Signals, data, and information provided from and to motion sensor 36, camera 38, and microphone/speaker 34 may be provided to and from the mobile communications device 700 via a communications link or channel from a transmitter of component 612 to a receiver of component 704 and from a transmitter of component 704 to a receiver of component 612. In this manner the mobile communications device 700 may monitor and control components 36, 38, and 34 of the apparatus 1 and 200, and generally communicate with the apparatuses 1, 100, and 200.

Although the invention has been described by reference to particular illustrative embodiments thereof, many changes and modifications of the invention may become apparent to those skilled in the art without departing from the spirit and scope of the invention. It is therefore intended to include within this patent all such changes and modifications as may reasonably and properly be included within the scope of the present invention's contribution to the art.

I claim:

1. A portable wireless aircraft security monitoring system comprising:

a first apparatus which is configured to removably attach to an exterior of an aircraft;

and a second apparatus which is configured to removably attach to the exterior of the aircraft; and wherein the second apparatus includes a wireless hub which communicates with a device of the first apparatus and which enables the device of the first apparatus to communicate on the Internet through the wireless hub of the second apparatus; and wherein the first apparatus includes one or more suction cups which are configured to removably attach to the exterior of the aircraft to removably attach the first apparatus to the exterior of the aircraft; and the second apparatus includes one or more suction cups which are configured to removably attach to the exterior of the aircraft to removably attach the second apparatus to the exterior of the aircraft.

2. The portable wireless aircraft security monitoring system of claim 1 further comprising a third apparatus which is configured to removably attach to the exterior of the aircraft; and wherein the third apparatus includes a device which is configured to communicate on the Internet through the wireless hub of the second apparatus.

3. The portable wireless aircraft security monitoring system of claim 2 wherein the first apparatus includes a camera and a base to which the camera is mounted, and the camera is oriented in a first direction with respect to the base of the first apparatus; and wherein the third apparatus includes a camera and a base to which the camera is mounted and the camera is oriented in a second direction with respect to the base of the third apparatus, where the second direction is substantially different from the first direction.

4. The portable wireless aircraft security monitoring system of claim 3 wherein the second direction is substantially perpendicular to the first direction.

5. The portable wireless aircraft security monitoring system of claim 1 wherein the first apparatus includes a camera which is configured to provide information via the Internet through the wireless hub of the second apparatus.

6. The portable wireless aircraft security monitoring system of claim 1 wherein the first apparatus includes a motion sensor which is configured to provide information via the Internet through the wireless hub of the second apparatus.

7. The portable wireless aircraft security monitoring system of claim 1 wherein the first apparatus includes a microphone which is configured to provide information via the Internet through the wireless hub of the second apparatus.

8. The portable wireless aircraft security monitoring system of claim 5 wherein the first apparatus includes a solar charger which is configured to provide power to the camera of the first apparatus.

9. The portable wireless aircraft security monitoring system of claim 1 wherein the first apparatus includes a camera, a motion sensor, a microphone, and a data processor; and wherein the camera, motion sensor, and the microphone provide information to the data processor, which communicates with the device of the second apparatus to communicate via the Internet.

10. A method for providing on-ground aircraft security monitoring comprising removably attaching a first apparatus to an exterior of an aircraft;

removably attaching a second apparatus to the exterior of the aircraft; and wherein the second apparatus includes a wireless hub which communicates with a device of the first apparatus and which enables the device of the first apparatus to communicate on the Internet through the wireless hub of the second apparatus; and wherein the first apparatus includes one or more suction cups which are configured to removably attach to the exterior of the aircraft to removably attach the first apparatus to the exterior of the aircraft; and the second apparatus includes one or more suction cups which are configured to removably attach to the exterior of the aircraft to removably attach the second apparatus to the exterior of the aircraft.

11. The method of claim 10 further comprising:

removably attaching a third apparatus to the exterior of the aircraft; and wherein the third apparatus includes a device which is configured to communicate on the Internet through the wireless hub of the second apparatus.

12. The method of claim 11 wherein the first apparatus includes a camera and a base to which the camera is mounted, and the camera is oriented in a first direction with respect to the base of the first apparatus; and wherein the third apparatus includes a camera and a base to which the camera is mounted and the camera is oriented in a second direction with respect to the base of the third apparatus, where the second direction is substantially different from the first direction.

13. The method of claim 12 wherein the second direction is substantially perpendicular to the first direction.

14. The method of claim 10 wherein the first apparatus includes a camera which is configured to provide information via the Internet through the wireless hub of the second apparatus.

15. The method of claim 10 wherein the first apparatus includes a motion sensor which is configured to provide information via the Internet through the wireless hub of the second apparatus.

16. The method of claim 10 wherein the first apparatus includes a microphone which is configured to provide information via the Internet through the wireless hub of the second apparatus.

17. The method of claim 14 wherein the first apparatus includes a solar charger which is configured to provide power to the camera of the first apparatus.

18. The method of claim 10 wherein the first apparatus includes a camera, a motion sensor, a microphone, and a data processor; and wherein the camera, motion sensor, and the microphone provide information to the data processor, which communicates with the device of the second apparatus to communicate via the Internet.

* * * * *